United States Patent
DeVore et al.

(10) Patent No.: US 7,149,617 B2
(45) Date of Patent: Dec. 12, 2006

(54) METHOD OF TIMED SHIFT TO NEUTRAL IN APPARENT STATIONARY MODES

(75) Inventors: James Henry DeVore, Laurinburg, NC (US); Robert Anthony Sayman, Laurinburg, NC (US); Ronald Peter Muetzel, Southern Pines, NC (US)

(73) Assignee: ZF Meritor, LLC, Maxton, NC (US)

( * ) Notice: Subject to any disclaimer, the term of this patent is extended or adjusted under 35 U.S.C. 154(b) by 166 days.

(21) Appl. No.: 10/701,791

(22) Filed: Nov. 5, 2003

(65) Prior Publication Data

US 2005/0096824 A1    May 5, 2005

(51) Int. Cl.
*G06F 7/00* (2006.01)
(52) U.S. Cl. ............................ 701/67; 701/52; 192/3.51
(58) Field of Classification Search ............ 701/51–52, 701/55, 67; 192/3.51, 20, 30 R, 31–32; 180/278; 280/278; 477/34, 39
See application file for complete search history.

(56) References Cited

U.S. PATENT DOCUMENTS

| | | | | | |
|---|---|---|---|---|---|
| 4,631,422 | A | * | 12/1986 | Piasecki | 327/579 |
| 6,170,587 | B1 | * | 1/2001 | Bullock | 180/69.6 |

* cited by examiner

*Primary Examiner*—Yonel Beaulieu
(74) *Attorney, Agent, or Firm*—Carlson, Gaskey & Olds

(57) ABSTRACT

A control for a transmission and a clutch monitors conditions to determine when a vehicle associated with the clutch and transmission is likely in a stationary state. If the vehicle appears to be stationary, with the transmission engaged and the clutch open, then the control determines that the transmission should be moved to a neutral position. Upon movement to the neutral position, the control then closes the clutch. It is preferable for a vehicle remaining stationary to have its clutch closed and its transmission in neutral than to have its transmission engaged and its clutch open. In a further aspect of this invention, the neutral state is verified by testing the ability to move one of the transmission shift components. If the transmission shift component can move beyond a predetermined amount, this is indicative that the transmission is in neutral.

7 Claims, 1 Drawing Sheet

METHOD OF TIMED SHIFT TO NEUTRAL IN APPARENT STATIONARY MODES

BACKGROUND OF THE INVENTION

This invention relates to a shift of a heavy vehicle transmission into neutral, when conditions indicate that the vehicle has remained stationary for a period of time.

Heavy vehicles have typically been provided with an automated clutch and an automatic, automated, or manual transmission. In an automatic or automated transmission, some actuators are provided with the transmission to move a transmission shift apparatus between the various speed ratios. Thus, as is known, an actuator such as a fluid piston will move shift forks, etc., to disengage a gear, and then move to engage another gear when a transmission speed ratio change is being implemented.

Further, many modern transmissions are associated with an automated clutch. An automated clutch is also actuated by an actuator.

One concern with modern heavy vehicles occurs when a vehicle is to remain stationary for a period of time. A driver may sometimes open the clutch, and leave the transmission engaged, while the vehicle continues to run. For several reasons, it would be desirable for the transmission to be in neutral and the clutch closed during these stationary running periods. However, to date, a control to achieve this desired state has not been developed.

SUMMARY OF THE INVENTION

In the disclosed embodiment of this invention, a control monitors operation of a heavy vehicle transmission and clutch. If the clutch is open, but conditions indicate the vehicle has remained stationary for a period of time, then the control may power the system to move the transmission into a neutral state. When a neutral state has been verified, the clutch is closed. Now, the vehicle remains stationary with the clutch closed and the transmission in neutral.

In preferred embodiments of this invention, the conditions that could be sensed included zero or low vehicle speed, with a running engine, transmission in gear, and no shift lever, brake pedal or accelerator pedal movements. Changes in any one of these conditions could restart a timer. However, once a particular period of time has expired with these conditions being within the indicated state, then a decision may be made that the vehicle is stationary. At that time, the control may actuate the shift actuator to move the transmission to neutral.

In a preferred embodiment, prior to this automatic shift to neutral, some buzzer or other warning may be utilized to signal the decision to move to neutral. In this way, the driver would not be surprised by the action should he still be in the vehicle. Also, an indicator light or warning sound could advise the operator to implement a neutral shift. If the operator does not address the problem, then the automatic shift may occur.

Further, after shifting to neutral, but prior to closing the clutch, some reliable way of ensuring the neutral state is preferably utilized. In one disclosed in this invention, the select actuator, a part of the transmission shift apparatus that selects a particular shift rail, is utilized to ensure a neutral state. In particular, the select actuator is moved in a first direction, and a sensor senses the amount of movement. The actuator is then moved in the opposed direction, and again, the amount of movement is sensed. An absolute difference between the two values is taken. If the absolute value is above a predetermined amount, the control can determine that the vehicle is in neutral. Stated in a simpler manner, the select actuator is not movable for any significant difference when a transmission gear is engaged. Thus, if the select actuator is movable a significant difference when moved in these two directions, this would be a reliable indication that the transmission is in neutral.

If this verification fails to indicate a neutral state, then the system may attempt to drive the transmission to neutral again.

These and other features of the present invention can be best understood from the following specification and drawings, the following of which is a brief description.

DETAILED DESCRIPTION OF THE PREFERRED EMBODIMENT

Figure 1:
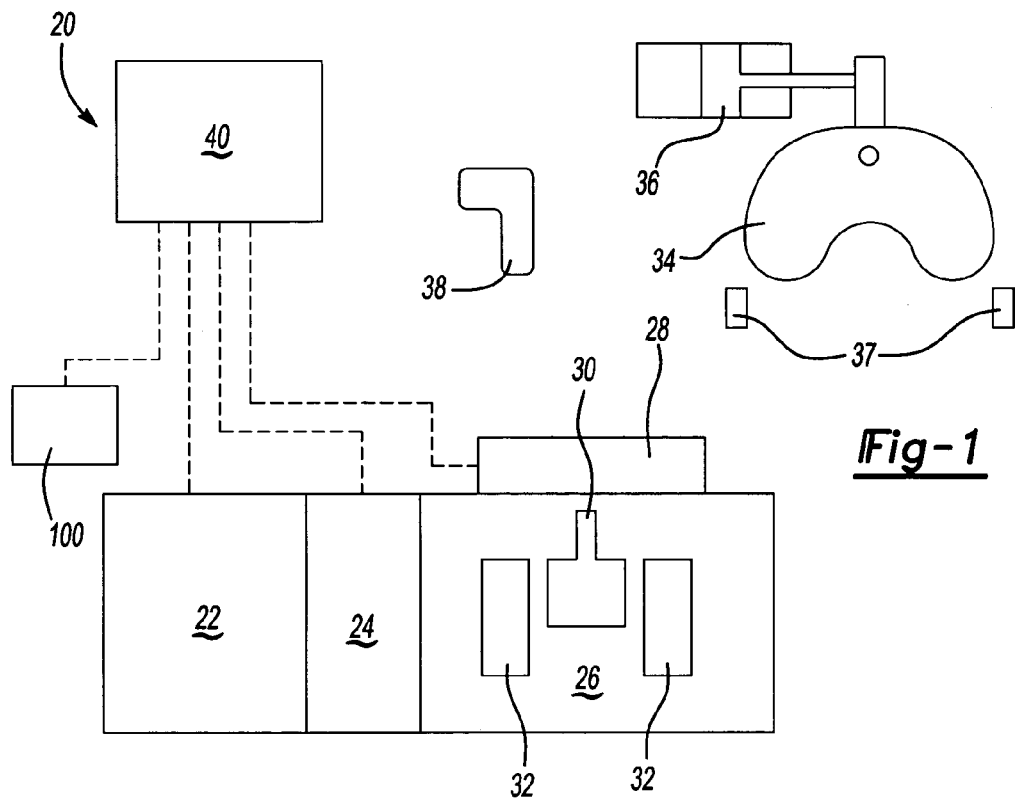
FIG. 1 is a schematic view of a system to incorporate this invention.

FIG. 1 shows a vehicle driveline 20 incorporating an engine 22 driving a clutch 24. Clutch 24 is selectively engaged to transmit drive from the engine 22 into a transmission 26. As shown, the transmission 26 is of the type provided by an actuator box 28 such that transmission gear shifts can be achieved without manual movement by the operator. As shown schematically, and as known, a shift collar 30 may be movable in a pair of distinct directions to selectively engage one of a pair of gears 32. The transmission is shown schematically, and such automated transmissions are known in the art. The present invention is directed to transmissions wherein an actuator 28 is operable to engage or disengage particular transmission gear speeds. Such actuators are incorporated into automated or automatic transmissions.

A portion of the shift apparatus, and namely the select actuator 34 is also shown schematically in this view. An actuator piston 36, which is part of actuator 28, is operable to rock the select actuator 34 between two positions to achieve a particular shift rail position, again as known. If the transmission is not in neutral, that is to say a gear is engaged, the select actuator 34 is not typically movable any appreciable distance. Thus, if the select actuator is movable for a significant distance, as measured by sensors 37, then an indication can be made that the transmission is in neutral.

A control 40 takes advantage of this fact to verify neutral in a preferred embodiment by actuating the actuator piston 36 to rock the select actuator 34 between two positions. The extent of movement is sensed by the sensors 37, shown schematically. If the magnitude of movement between the two positions exceeds a predetermined amount, then a determination can be made that the transmission 26 is in a neutral state.

As also shown in FIG. 1, a shift lever 38 may be operated by the operator to request a transmission gear ratio change. Signals from each of the main components described above are all sent to the control 40, shown schematically.

Figure 2:
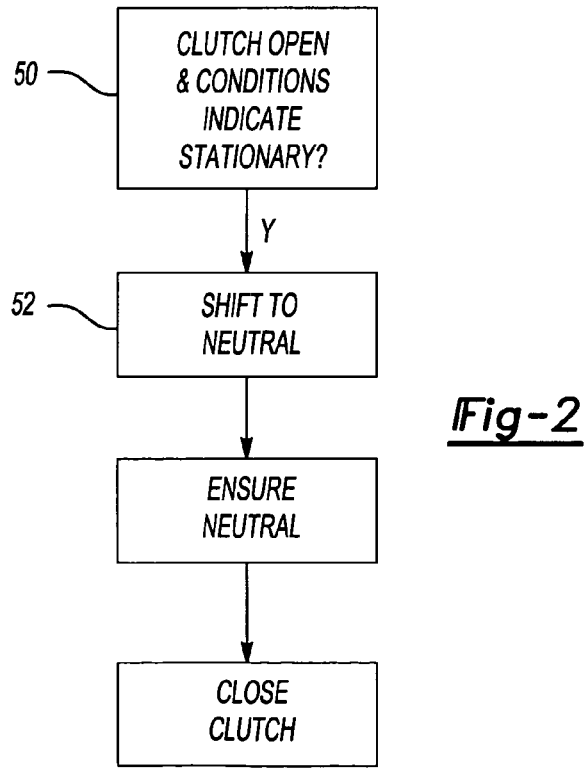
FIG. 2 is a flow chart.

The present invention includes the control 40 monitoring operational conditions. A flow chart is shown in FIG. 2. If the control 40 determines that the vehicle is likely in a stationary state, with the transmission engaged and the clutch open, then the control 40 will power a shift to neutral. Among the conditions the control 40 may look to to determine this mode will be a vehicle speed below a predetermined maximum, the engine running, the transmission engaged in gear, and no shift lever, brake pedal or accelerator pedal movements. If such conditions exist for a predetermined period of time, then the transmission control 40 may move to step 52 and order a shift to neutral by the actuator 28. However, should any one of the conditions mentioned above change during the particular time period, then the control will restart a timer.

Once the transmission actuator 28 has moved the shift actuator 30 such that the transmission is in neutral, verification of the neutral condition is performed. In particular, and in the preferred embodiment, the select actuator 34 is moved between two sides. If the amount of movement sensed by the sensors 37 is significant, or above a predetermined amount, then a decision can be made that the transmission is in neutral. The select actuator 34 would typically not be movable any appreciable distance if the transmission were not in neutral. Thus, the determination of significant movement can be taken as verification that the transmission is in neutral. Once it is determined or verified that the transmission is in neutral, the clutch 24 may be closed.

An operator display 100 or warning may provide the operator with a signal that the shift to neutral is about to occur. Also, once the determination has been made that the transmission should be in neutral, the display 100 may provide a prompt to the operator such as a flashing light, or some indication that the driver should himself move the transmission to neutral. If the driver does not follow this prompt, then the transmission may then move to the automatic shift to neutral.

If in fact the verification fails to indicate the transmission is in neutral, the system may return to method box 52 and again attempt to shift to neutral. Alternatively, the unit may be shifted back to fully engaged before a retry.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling a vehicle comprising the steps of:
   (1) monitoring system conditions to determine a stationary mode at which the vehicle is moving below a pre-determined speed with a transmission engaged;
   (2) moving said transmission to a neutral position if monitored system conditions indicate a stationary mode for a predetermined period of time; and
   wherein a clutch is associated with said transmission, and said clutch being closed after step (2) following steps (1) and (2) being automatically performed by electronic control.

2. A method as set forth in claim 1, wherein between step (2) and the closing of said clutch, including the step of verifying that the transmission is in a neutral state.

3. A method as set forth in claim 2, wherein a component of a shift assembly for the transmission is moved, and if significant movement is sensed, then a determination is made that the transmission is in neutral.

4. A method as set forth in claim 3, wherein said component is a select actuator.

5. A method as set forth in claim 1, wherein the movement of step (2) occurs automatically.

6. A method as set forth in claim 5, wherein prior to the automatic movement of said transmission to a neutral position, an operator of the vehicle is provided with a prompt suggesting the operator move the transmission to neutral.

7. A method of controlling a vehicle comprising the steps of:
   (1) monitoring system conditions to determine a stationary mode at which the vehicle is moving below a pre-determined speed with a transmission engaged;
   (2) providing a prompt to an operator indicating that the operator should move said transmission to a neutral position: and
   wherein the transmission is moved automatically to a neutral position if the operator does not follow the prompt within a predetermined period of time.

* * * * *